United States Patent [19]
Wyse et al.

[11] Patent Number: 5,987,986
[45] Date of Patent: Nov. 23, 1999

[54] NAVIGATION GRADE MICROMACHINED ROTATION SENSOR SYSTEM

[75] Inventors: Stanley F. Wyse, Encino; Robert E. Stewart, Woodland Hills; Samuel H. Fersht, Studio City, all of Calif.

[73] Assignee: Litton Systems, Inc., Woodland Hills, Calif.

[21] Appl. No.: 08/903,499

[22] Filed: Jul. 30, 1997

Related U.S. Application Data

[63] Continuation-in-part of application No. 08/522,523, Sep. 1, 1995, abandoned, which is a continuation-in-part of application No. 08/282,757, Jul. 29, 1994, abandoned.

[51] Int. Cl.[6] ................................................. G01P 9/04
[52] U.S. Cl. ............................................... 73/504.12
[58] Field of Search .......................... 73/504.12, 504.14, 73/510

[56] References Cited

U.S. PATENT DOCUMENTS

| 5,016,072 | 5/1991 | Greiff | 73/504.12 |
| 5,065,627 | 11/1991 | Stewart et al. | 73/505 |
| 5,377,544 | 1/1995 | Dunn | 73/504.12 |
| 5,396,797 | 3/1995 | Hulsing, II | 73/505 |
| 5,555,765 | 9/1996 | Greiff | 73/504.09 |
| 5,650,568 | 7/1997 | Greiff et al. | 73/504.09 |

OTHER PUBLICATIONS

Boser et al. "Monolithic Surface–Machined Inertial Sensors" May 7–9, 1997.

*Primary Examiner*—John E. Chapman
*Attorney, Agent, or Firm*—Lynn & Lynn

[57] ABSTRACT

An angular rate sensor provides a digital delta theta output signal. A drive member is formed of a single, silicon wafer having a pair of oppositely-facing planar surfaces. The drive member includes a frame and a drive member central portion connected to the frame and arranged to have rotational compliance between the frame and the central portion about an axis perpendicular to the planar surfaces of the silicon wafer. Drive signals are applied to a plurality of electrodes on the central portion to cause rotational oscillation of the drive member central portion about a drive axis perpendicular to the planar surfaces of the silicon wafer. A silicon sensing member is connected to the drive member. The sensing member has a central support member connected to the drive member central portion such that rotational oscillations of the drive member central portion are transmitted to the sensing member central portion. A sensing portion is connected to the sensing member central support member to allow the sensing portion to oscillate about the drive axis and to allow an input rotation rate about an axis perpendicular to the drive axis to produce out-of-plane oscillations of the sensing portions. Signal processing apparatus is connected to the sensing portion for producing a signal indicative of the input rotational rate as a function of the amplitude of the out-of-plane oscillations of the sensing portion.

19 Claims, 13 Drawing Sheets

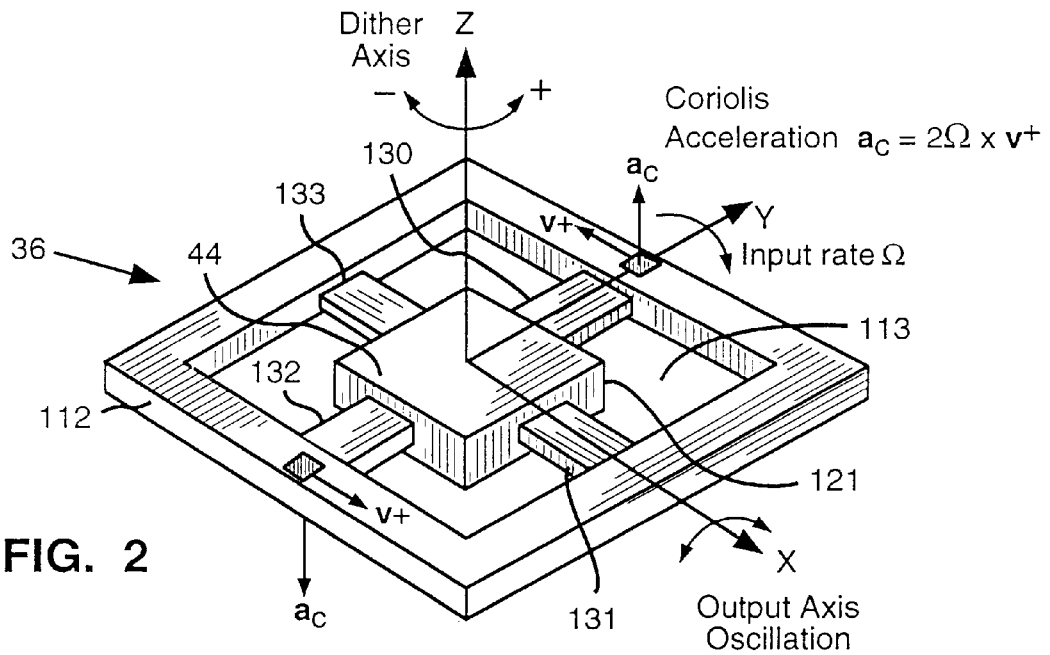
FIG. 2
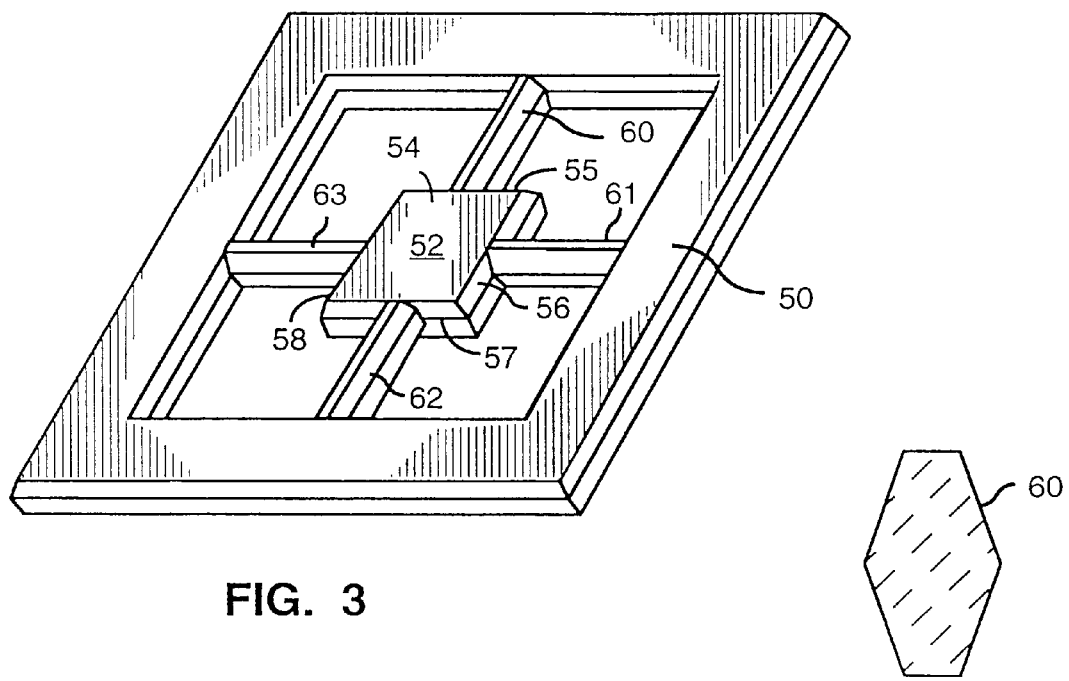
FIG. 3
FIG. 4

NAVIGATION GRADE MICROMACHINED ROTATION SENSOR SYSTEM

BACKGROUND OF THE INVENTION

This is a continuation-in-part of applicants' application Ser. No. 08/522,523, now abandoned, which was filed Sep. 1, 1995 as a continuation-in-part of application Ser. No. 08/282,757, filed Jul. 29, 1994 now abandoned.

This invention relates generally to rotation sensors for use in applications such as navigation. In particular this invention relates to a rotation sensor system that provides high accuracy while operating in the high G, high vibration environment of reentry vehicles and the like. Still more particularly, this invention relates to a rotation sensor system based on a silicon chip that includes Coriolis acceleration sensors for measuring rotation rates about two orthogonal sensing axes.

Previously known micromachined Coriolis rotation sensor systems have demonstrated bias repeatability in the 10° to 1000°/hr range. Based on an analysis of these concepts, it does not appear credible that their performance could be improved by three to five orders of magnitude to produce a high-accuracy navigation grade device, while meeting the low cost and high reliability objectives presently set for the rotation sensor system of the present invention.

SUMMARY OF THE INVENTION

A rotation sensor design according to the invention incorporates many of the performance advantages of the tuned rotor gyro while exploiting the low cost and reliability benefits of micromachining. Essentially the rotation sensor according to the present invention may be visualized as a tuned rotor gyroscope except that the "rotor" angularly vibrates about the "spin axis", instead of steadily rotating about the spin axis. A rotation sensor according to the present invention may provide rotation sensing about either one or two axes. The angular momentum vector oscillates sinusoidally instead of remaining constant. The rotor is an inertially tuned sensing element, tuned to be resonant about its output axis at the oscillating frequency, instead of at spin speed.

The rotation sensor according to the present invention is preferably a closed loop angular rate sensor which provides a digital delta theta output signal. The micro-inertial rotation sensor according to the present invention is designed to operate in the high G, high vibration environment associated with high lift-to-drag reentry vehicles and hypersonic submunitions. The rotation sensor according to the present invention comprises at least one solid state sensing element and is also designed to have small size and low weight, very low cost, low power, high reliability and for use in both commercial and military applications.

A rotation sensor according to the present invention comprises frame and a rotationally compliant mounting apparatus connected to the frame. A driving mechanism is connected to the rotationally compliant mounting apparatus to produce rotational oscillations about a drive axis. A sensing apparatus having a support element is connected to the driving mechanism such that rotational oscillations of the drive member about the drive axis are transmitted to the support element. The sensing apparatus may further include a sensing element connected to the support element and arranged to oscillate with the support element about the drive axis. The sensing element is arranged to oscillate rotationally relative to the support element about a sensing axis perpendicular to the drive axis for input rotation rates of the frame about the sensing axis. The sensing element is formed such that its moment of inertia about the drive axis is substantially equal to the sum of the moments of inertial about its two principal axes perpendicular to the drive axis. The rotation sensor also includes apparatus for generating a signal indicative of the input rotation rate as a function of the amplitude of the oscillations of the sensing element about the sensing axis.

The rotation sensor may include two sensing members having sensing elements having sensing axes that may be either parallel or perpendicular.

A two axis rotation sensor according to the invention comprises a base and a drive member mounted to the base and formed of a single, silicon wafer having a pair of oppositely-facing planar surfaces. The drive member includes a frame and a drive member central portion connected to the frame and arranged to have rotational compliance between the frame and the central portion about an axis perpendicular to the planar surfaces of the silicon wafer. The drive member further comprises a plurality of electrodes formed on at least one side of the central portion and a drive apparatus for applying drive signals to the plurality of electrodes. The electrodes are arranged such that the drive signals cause rotational oscillation of the drive member central portion about a drive axis perpendicular to the planar surfaces of the silicon wafer.

The two axis rotation sensor according to the invention further comprises a silicon sensing member that includes a sensing member central support member connected to the drive member central portion such that rotational oscillations of the drive member central portion are transmitted to the sensing member central portion. A sensing portion is connected to the sensing member central support member to allow the sensing portion to oscillate about the drive axis and to allow an input rotation rate about an axis perpendicular to the drive axis to produce out-of-plane oscillations of the sensing portions. Signal processing apparatus is connected to the sensing portion for producing a signal indicative of the input rotational rate as a function of the amplitude of the out-of-plane oscillations of the sensing portion.

The two axis rotation sensor according to the invention preferably further comprises a plurality of flexure beams connected between the frame and drive member central portion.

The two axis rotation sensor according to the invention preferably further comprises a plurality of generally planar leaf spring members connected between the sensing member central support member and the sensing portion such that the out-of-plane oscillations in the sensing portion are perpendicular to the planes of the leaf spring members. A capacitive pickoff is preferably formed by the sensing portion such that the out-of-plane oscillations of the sensing portion produce capacitance changes in the capacitive pickoff.

The two axis rotation sensor according to the invention preferably further comprises a plurality of base mounts connected between the base and the frame of the drive member. Each base mount is preferably formed to comprise a damped compliant element for providing a single mechanical resonant frequency in the two axis rotation sensor and for attenuating external vibration inputs.

Signal processing apparatus included in the invention preferably comprises a buffer amplifier circuit connected to the capacitive pickoff and arranged to receive signals indicative of the input rotation rate. A first demodulator circuit may be connected to the buffer amplifier output for demodulating the sensor element response signal with the cosine of the drive frequency. A first compensation circuit may be connected to receive signals output from the first demodulator circuit, and a second demodulator circuit may be connected to the buffer amplifier for demodulating the sensor element response signal with the sine of the drive frequency. A second compensation circuit may be connected to receive signals output from the second demodulator circuit. A first torquing modulator circuit may be connected to the first compensation circuit, and a second torquing modulator circuit may be connected to the second compensation circuit. The signal processing apparatus may still further include a summing circuit for adding signals output from the first and second torquing modulator circuits, the summing circuit producing a feedback signal that is input to a set of torquing electrodes on the drive member.

A two axis rotation sensor according to the invention may also comprise a pair of identical drive member/sensing portion combinations mounted together in a face-to-face relationship. Each drive member and sensing portion is formed in the manner described above. Drive signals cause the sensing portions to oscillate in opposite directions.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 2 is a perspective view of a rate sensing element that may be included in the rotation sensor of FIG. 1;

FIG. 3 is a perspective view of a portion of a drive member that may be included in the apparatus of FIG. 1;

FIG. 4 is a cross-sectional view of a flexure beam that may be included in the apparatus of FIG. 3;

DESCRIPTION OF THE PREFERRED EMBODIMENT

Figure 1:
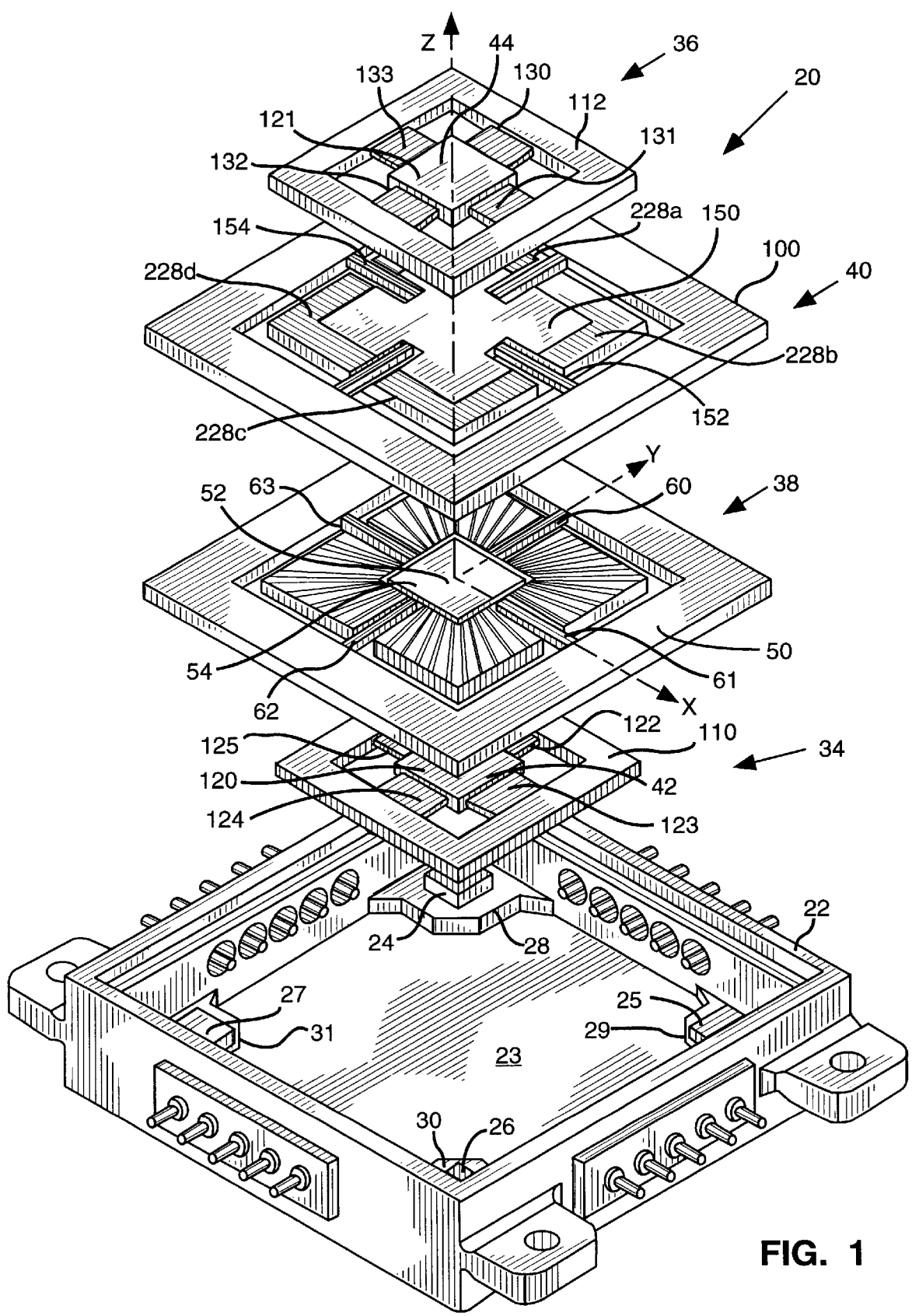
FIG. 1 is an exploded perspective view of a solid state two axis rotation sensor according to the present invention.

Referring to FIG. 1, a rotation sensor 20 according to the present invention includes a base 22 having a bottom cover 23 and a top cover (not shown) that is preferably essentially identical to the bottom cover 23. The base 22 has a generally rectangular cross section. The base 22 includes base mounts 24–27 mounted inside the base 22 at the corners 28–31, respectively.

The rotation sensor 20 comprises a pair of rate sensing members 34 and 36 that are preferably identical. Each of the rate sensing members 34 and 36 is preferably formed from a single silicon crystal by a micromachining process. The rotation sensor 20 further includes a pair of drive members 38 and 40 that are also identical and that also are each formed from single silicon crystals.

FIG. 1 shows opposite surfaces 42 and 44 of the rate sensing members 34 and 36, respectively. When the rotation sensor 20 is assembled, the surface 42 of the rate sensing member 34 is bonded to the lower surface of the drive member 38 as viewed in FIG. 1. Similarly, the lower surface of the rate sensing member 36 is bonded to the drive member 40.

The drive member 38 includes a peripheral frame 50 that is shown to be generally rectangular for convenience of illustration. The frame 50 may have other configurations. Referring to FIG. 3, a central portion 52 of the upper surface 54 of the drive member 38 is thinner than the frame 50. Referring to FIGS. 1 and 3, the central portion 52 has side edges 55–58 that are connected to the frame 50 by flexure beams 60–63. The flexure beams 60–63 preferably extend from the centers of the side edges 55–58 to the frame 50. In FIG. 3 part of the drive member 38 is omitted to show more clearly the central portion 52 and the flexure beams 60–63. FIG. 4 shows the cross section of the flexure beam 60 formed by etching the silicon crystal. The flexure beams 60–63 are preferably identical and have high resistance to bending in the vertical plane as viewed in FIGS. 1, 3, 4 and 7. The flexure beams 60–63 have low resistance to bending in the horizontal plane so that the central portion 52 may oscillate with a small amplitude rotational motion about a vertical axis through its geometric center.

Figure 5:
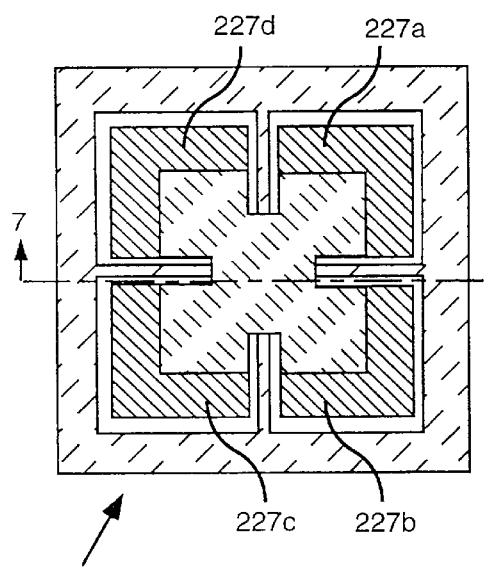
FIG. 5 is a bottom plan view of a drive member and sensor pickoff and torquing electrodes that may be included in the apparatus of FIG. 1.

FIG. 5 illustrates the bottom side of the drive member 38. The drive member 38 includes four torquer electrodes 227a–227d that may be formed by metallizing selected portions of the drive member 38. These torquer electrodes 227a–227d are preferably identical to torquer electrodes 228a and 228d shown in FIG. 1 on the drive member 40. The sensing elements 110 and 112 face the torquer electrodes 227a–227d and 228a–228d, respectively. The torquer electrodes are used to apply feedback torque to the sensing elements 110 and 112 as explained subsequently in the description of signal processing apparatus that may be included in the present invention.

Thus it is seen that the central portions 120 and 121 of the sensing members 34 and 36, respectively, support the sensing elements 110 and 112, respectively. The sensing elements 110 and 112 are arranged to oscillate rotationally relative to their supports 120 and 121, respectively, about a sensing axis perpendicular to the drive axis for input rotation rates of the base, or frame, 22 about the sensing axis. Each sensing element 110 and 112 is formed such that its moment of inertia about the drive axis is substantially equal to the sum of the moments of inertial about its two principal axes perpendicular to the drive axis.

Figure 6:
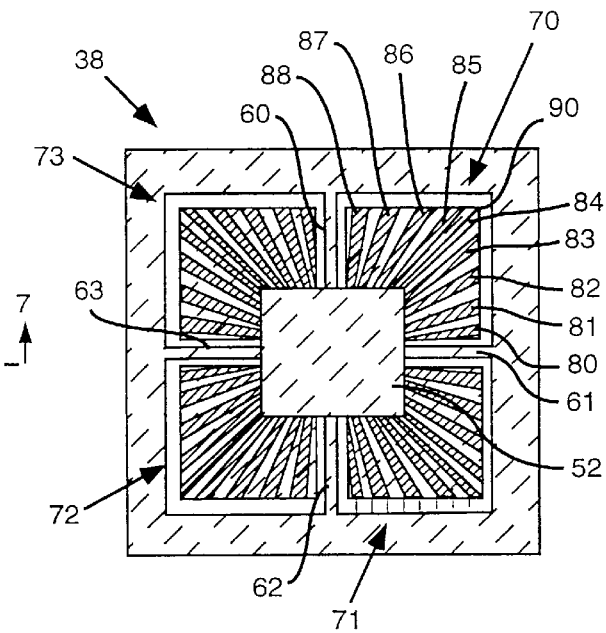
FIG. 6 is a top plan view of the drive member of FIGS. 1 and 5.

Referring to FIGS. 1 and 6, four groups of electrode assemblies 70–73 are formed on the drive member 38 by appropriate metallizing of portions of the crystal that forms the drive member 38. The electrode assemblies are connected to the central portion 52 between the flexure beams 60–63. Referring to FIG. 6, the cross hatched portions of the electrode assembly 70, for example, indicate the separate electrodes 80–88. The electrodes 80–88 are positioned with respect to the corner 90 of the electrode assembly 70 such that in the identical drive member 40, the corresponding electrodes are displaced angularly with respect to one another.

The displacement between the corresponding electrodes occurs as the identical drive member 40 is turned over and then arranged so that the electrode assemblies are face-to-face. The angular displacement of the electrodes in the two drive members 38 and 40 allows the electrodes to attract each other in an oscillatory manner at a frequency of twice the applied frequency, which causes oppositely directed rotational oscillations of the electrodes and corresponding central portions of the drive members. Electrical signal sources are connected to the two drive members to apply driving signals to the electrodes. The driving signals preferably drive each drive member at its resonant frequency. Preferably the resonant frequencies of the drive members 38 and 40 are identical and are typically about 5 kHz.

The two center drive members 38 and 40 together form a counter-rotational torsionally resonant mechanical oscillator. The two outer rate sensing members 34 and 36 together form a two axis tuned inertial rate sensing system.

Figure 7:
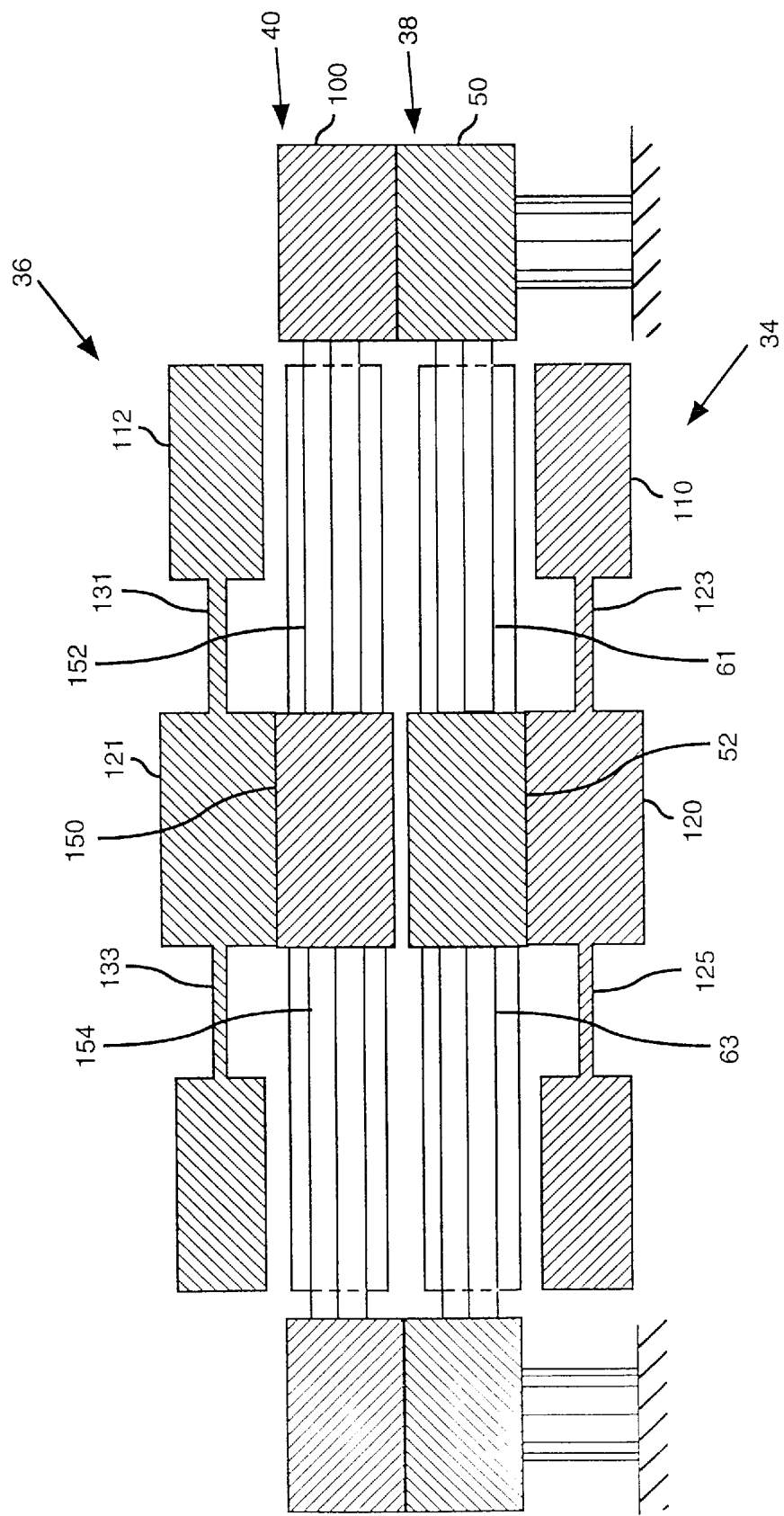
FIG. 7 is a cross-sectional view taken along line 7—7 of FIG. 5 of a rotation sensor assembly that includes a capacitive signal pickoff that may be included in the apparatus of FIG. 1.

Referring to FIGS. 1, 3 and 7, the central portion 52 of the drive member 38 has a thickness that is less than the thickness of the frame 50. The central portion 150 of the drive member 40 is also thinner than its frame 100. The difference in thickness of the central portions and the frames causes a small gap to exist between the central portions when the frame 50 of the drive members 38 and the frame 100 of the drive member 40 are bonded together.

Referring to FIGS. 1, 2 and 7, the rate sensing members 34 and 36 have sensing elements 110 and 112, respectively. The rate sensing member 34 includes a central portion 120 and a plurality of compliant leaf springs 122–125 that extend from the central portion 120 to the sensing element 110. Similarly, the rate sensing member 36 has leaf springs 130–133 that extend from its central portion 121 to the sensing element 112. The sensing element 112 is preferably formed as a generally thin rectangular structure that has a generally rectangular central opening 113. The central portion 121 is thicker than the sensing element 112, which is thicker than the leaf springs 130–133 as may be seen in FIGS. 2 and 7. The Coriolis accelerations $a_c$ cause these oscillations, which force the sensing elements 110 and 112 to oscillate about the x-output axis as shown in FIG. 2. The Coriolis accelerations shown are equal to twice the input rate times the instantaneous velocity $v^+$ of the sensing element 112 generated by the dither drive motion.

FIG. 7 indicates the structure resulting from bonding the drive members 38 and 40 together and then bonding the rate sensing members 34 and 36 to the central portions of the back surfaces of the drive members 38 and 40, respectively. Only the thickest central portions 120 and 121 of the rate sensing members 34 and 36, respectively are bonded to the corresponding drive members 38 and 40. The leaf springs 121–125 and 130–133 are thus free to oscillate with small amplitude along the Z-axis as seen in FIGS. 1 and 2 and in the plane of the paper as seen in FIG. 7.

Referring to FIGS. 1 and 7, after the drive members 38 and 40 and the rate sensing members 34 and 36 are bonded together, they are placed in the base 22 so that the corners of the drive members 38 and 40 contact the base mounts 24–27. The base mounts 24–27 preferably are each formed to comprise a damped compliant element between the mechanical oscillator support base 22 and frame 50 of the drive member 38. This compliant element is necessary to insure that the counter-rotational mechanical oscillator has a single resonant frequency. The compliant element also provides the additional benefit of attenuating external vibration inputs.

When the rotation sensor 20 is fully assembled and drive voltages are applied to the electrode assemblies of both drive members 38 and 40, the rotation sensor 20 is ready for use in detecting rotations about in-plane axes labeled X and Y in FIGS. 1 and 2. A rotation input about the X or Y axis produces out-of-plane oscillations in the rate sensing elements 110 and 112. These out-of-plane oscillations are caused by out-of-plane Coriolis forces that are generated on an object that is oscillating in the plane by rotation of the object about an axis in the plane as shown in FIG. 2. The leaf springs 122–125 and 130–133 allow an appropriate amount of out-of-plane oscillation about the in-plane axis in response to input rotations. The two rate sensing elements 110 and 112 preferably have X axis resonant frequencies that are substantially equal. Similarly, the Y axis resonant frequencies of the rate sensing elements 110 and 112 preferably are the same. These resonant frequencies are preferably equal to the oscillating frequency of the drive member.

The out-of-plane oscillations caused by input rotation rates about either the X or Y axis cause the relative displacements between the drive members 38 and 40 and the corresponding rate sensing elements 110 and 112 to change. These changing displacements are seen as changes in capacitance, which provides a capacitive pickoff that is explained subsequently.

In FIGS. 1 and 7 the central portion of the drive member 40 is indicated by the reference numeral 150. The drive member 40 is also indicated as having flexure beams 152 and 154 that correspond to the flexure beams 61 and 63, respectively, of the drive member 38.

Figure 8:
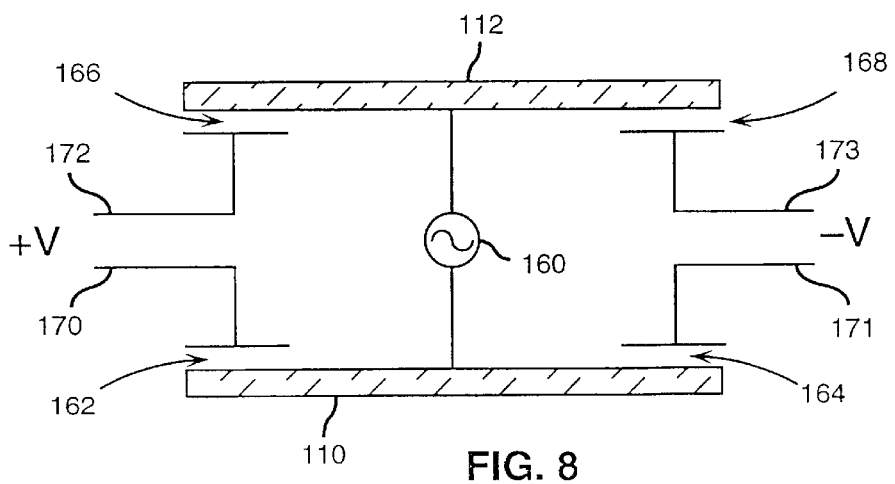
FIG. 8 schematically illustrates biasing and electrical signal pickoff for the apparatus of FIG. 7.

FIG. 8 schematically illustrates the capacitive signal pickoff. An oscillator 160 provides a reference excitation signal at a frequency $\omega_c$ to the rate sensing elements 110 and 112. The reference excitation may have a voltage of about 10 volts and a frequency of $\omega_c=250$ kHz. Capacitors 162 and 164 are formed between the drive member 38 and the rate sensing element 110. Capacitors 166 and 168 are formed between the drive member 40 and the rate sensing element 112. A drive voltage of about +10 volts is applied to the capacitors 162 and 166. A drive voltage of about −10 volts is applied to the capacitors 164 and 168. Electrical leads 170–173 carry the oscillatory signals that indicate the rotation rate to signal processing circuitry discussed below.

Figure 9:
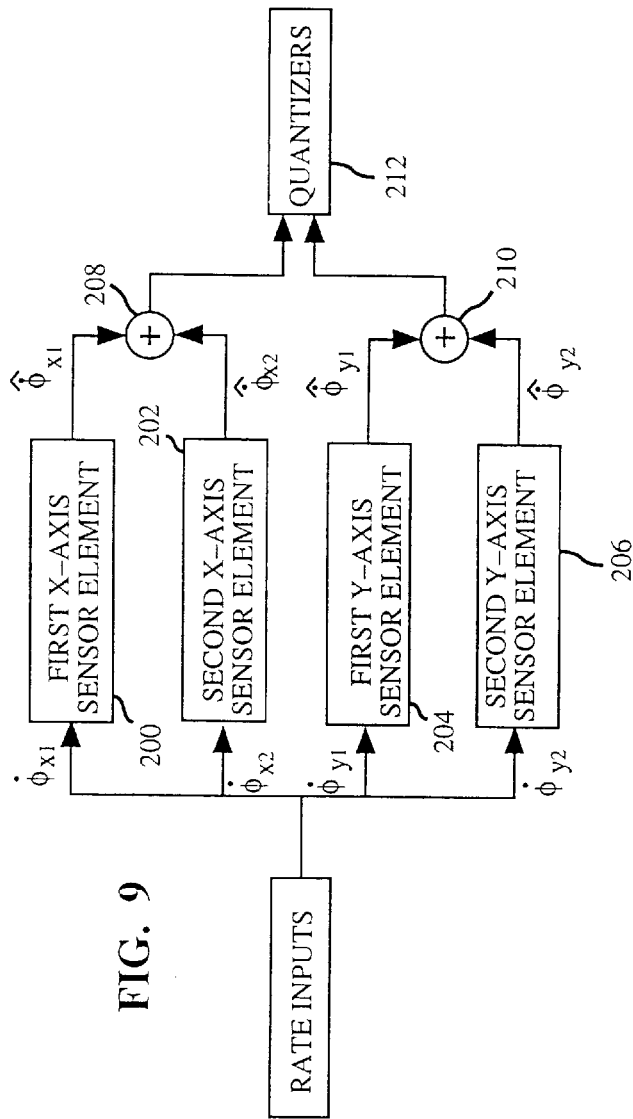
FIG. 9 illustrates circuitry for processing signals output from a Coriolis rotation sensor having each sensing element independently captured for each axis.

Referring to FIG. 9, there is shown a basic form for the signal processing for embodiments of the invention that include two sensing elements such as those shown in rate sensing members 34 and 36 for each of the X and Y axes. The rotation rate is applied first and second X axis sensor elements 200 and 202 and to first and second Y axis sensor elements 204 and 206. The outputs of the first and second X axis sensor elements 200 and 202, respectively, are input to a summer 208. Likewise, the outputs of the first and second Y axis sensor elements 204 and 206, respectively, are input to a summer 210. The summers 208 and 210 then provide the X and Y axis rotation signals to quantizers 212.

Figure 10:
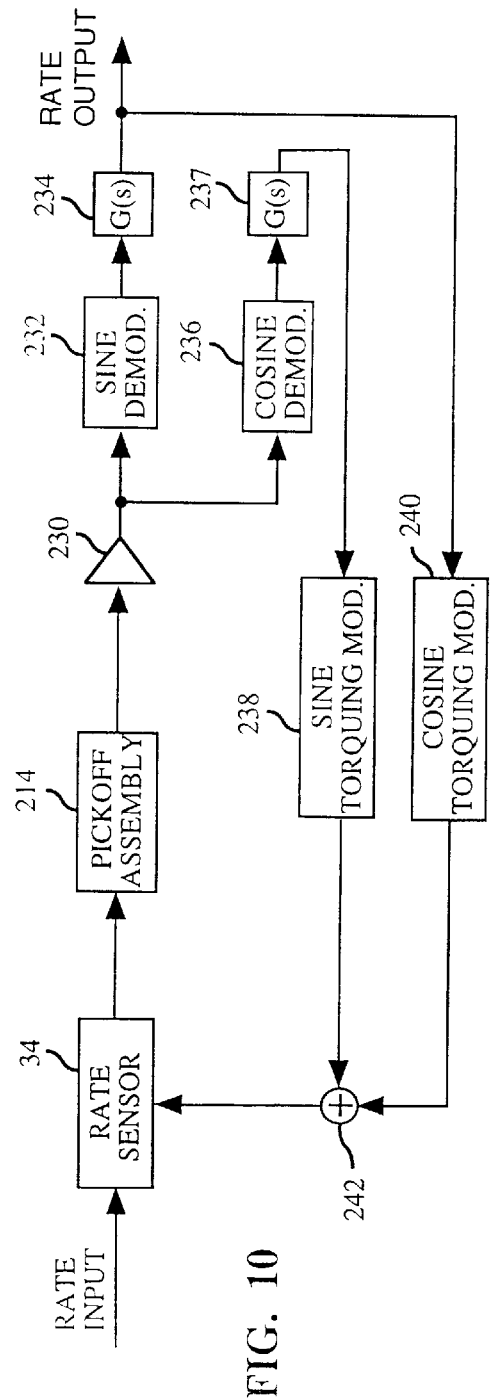
FIG. 10 is a block diagram illustrating additional features of the circuitry of FIG. 9.

The sensor circuits 200–206 may be identical. A structure for each of four sensor circuits 200–206 is shown in FIG. 10. The angular rate is applied to the rate sensor 34. A pickoff assembly 214 produces an electrical signal that is indicative of the response of the sensor element 110 to the rotation rate. The signal output from the pickoff assembly 214 represents the dynamically modulated signal generated by Coriolis forces from the counter-rotational driving motions at frequency $\omega_D$, as shown in FIG. 2. These in-phase signals can be arbitrarily referenced as a cosine function of the drive signal. A signal indicative of quadrature dynamic errors can then be characterized as a sine function of the drive signal.

The output of the signal pickoff assembly 214 is then amplified by an amplifier 230. The amplifier 230 provides outputs to a pair of demodulators 232 and 236 that demodulate the signal with $\sin \omega_D t$ and $\cos \omega_D t$, respectively. The outputs of the demodulators 232 and 236 are input to corresponding servo compensation circuits 234 and 237, respectively. The signal output of the servo compensation circuit 234 is the angular rate signal that is sent to the appropriate summer 208 or 210 of FIG. 9. The signals output from the servo compensation circuits 234 and 237 are also input to torquing modulator circuits 238 and 240 that modulate the signals input thereto with $\sin \omega_D t$ and $\cos \omega_D t$, respectively. The signals output from the torquing modulator circuits 238 and 240 are input to a summer 242. The output of the summer 242 is then fed into the sensing element torquing electrodes 227a–227d on drive member 38 of FIG. 5 to provide feedback torque to the sensing member 34.

Figure 11:
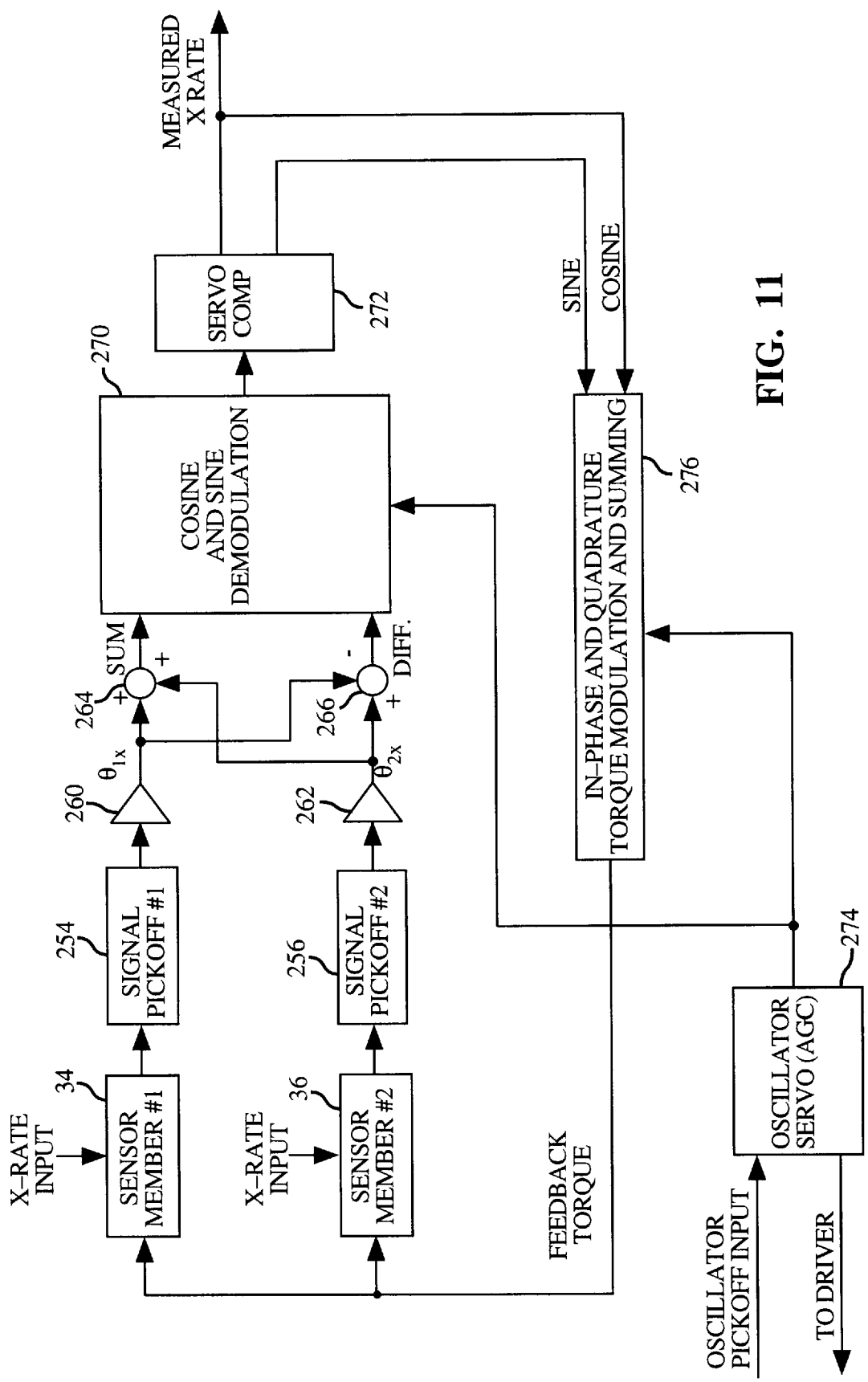
FIG. 11 is a generalized block diagram of circuitry for processing signals output from a Coriolis rotation sensor in which both sensing elements are combined in one capture loop for each axis.

FIG. 11 illustrates signal processing circuitry in which signals from both sensing elements are combined in one capture loop. An X rate input is applied to sensor members 34 and 36 which are being modulated by Coriolis forces at the drive frequency $\omega_D$. Pickoff circuits 254 and 256 generate amplitude responses of the first and second rate sensing members 34 and 36 at the frequency $\omega_D$. Amplifiers 260 and 262 amplify signals output from the circuits 254 and 256, respectively. A summer 264 produces a signal indicative of the sum of the signals output from the circuits 254 and 256, and a summer 266 produces a signal indicative of the difference of the signals output from the circuits 254 and 256. The sum and difference signals are then input to a demodulator 270 that performs in-phase and quadrature demodulation. The output of the demodulator 270 is input to a servo compensation circuit 272, which then produces the measured rate of rotation about the X axis.

A signal from the driven members' servo oscillator 274 is connected to the demodulator 270 and to a modulation and summing circuit 276 that provides in-phase and quadrature torque modulation and summing. The modulation and summing circuit 276 receives signals from the servo compensation circuit 272 and provides a feedback torquing signal to the sensing elements 110 and 112 in sensing members 34 and 36.

The invention preferably includes apparatus identical to that of FIG. 11 for the Y axis.

FIG. 11 shows the signals from both sensing members 34 and 36 being summed and differenced before the feedback torques are applied. This approach enhances the Q of the output axis tuning. If each sensing member were independently captured, the Q would be attenuated by not allowing the feedback torques to be phase-locked in a counter-oscillating mode where the reaction torques for each member balance against each other. Energy would be dissipated in the base mount if each member was captured independently. To completely capture the sensor deflections both the in-phase and quadrature signals and the sum and difference signals must be nulled. The signal representing the applied rate is the in-phase component of the differenced signal. The other feedback torques correct for common mode and quadrature torques from undesirable cross-coupled inputs and angular acceleration inputs.

There are several significant and unique features to the rotation sensor according to the present invention which reduce vibration rectification errors and improve bias repeatability. These features enable the rotation sensor 20 to meet the performance and environmental requirements for the rotation sensor 20 to meet the following navigational requirements:

Bias Repeatability—0.01°/hr;

Scale Factor Error—20 PPM;

Angle Random Walk—0.001°/√hr; and

G Sensitivity—less than 0.01°/hr/G.

First, common mode rejection of linear vibration for both axes is achieved by having the centers of gravity of the sensing elements 110 and 112 coincident with their centers of suspension. Also their is no concern for the matching and tracking of the phase and gain of independent acceleration sensors as used in other mechanizations of vibrating rate sensors. Second, the inertial rate sensing element is mechanically isolated from out-of-plane drive forces which introduce bias error. Third, the drive motion does not develop any relative motion between the inertial rate sensing element and its pickoff because each drive member and its associated sensing element move together as a single unit. Fourth, the torsional mechanical oscillator assembly of the drive members 38 and 40 and the sensing members 34 and 36 is counter balanced, which minimizes the sensitivity to variations in external mechanical impedances which can also lead to bias errors.

The mechanical oscillations of the drive members 38 and 40 provide the necessary vibratory velocity excitation for two axis Coriolis angular rate sensing. The spring constant of the four flexure elements 60–63 and the inertias of the oscillating elements 52 and 34 coupled with the other four flexure elements of the drive member 40 and the inertias of the oscillating elements 36 and 150 establishes the oscillator resonant frequency, while the peak velocity amplitude is sensed by the oscillator pickoff and controlled by the drive electronics applying signals to the drive electrodes on the opposing surfaces of the oscillating plates. On the opposite surfaces of the oscillating plates are the pickoff/forcer electrodes used to force rebalance each axis of the inertial rate sensing elements 110 and 112. It should be noted that all drive, pickoff/forcer electrodes and electrical contacts are confined to the mechanical oscillator.

The natural frequency of the mechanical oscillator is on the order of 5 KHz with the resonant frequency of the total rotation sensor chip and the base mount compliant elements being on the order of 1 KHz. A desired bandwidth of 500 Hz can therefore be met easily.

In operation, the upper rate sensing member 36 and lower rate sensing member 34 are driven 180° out of phase by the drive members 38 and 40. The upper and lower rate sensing elements 110 and 112 respond to the input of an angular rate about an axis perpendicular to the axis of the mechanical oscillator by oscillating about an axis perpendicular to both the input axis and the mechanical oscillator axis. Components of this Coriolis induced oscillation of the rate sensing element are sensed by X and Y axis capacitive pickoffs as shown in FIG. 8. These pickoff signals are applied to the X and Y channels of the rotation sensor servo electronics, which provides feedback voltages to electrostatically force the rate sensing elements 110 and 112 to null. The magnitudes of the feedback voltages on each axis are linearly proportional to the X and Y components of the input angular rate.

The signal processing circuitry servos both the in-phase and quadrature signals in a manner that allows the loop to have integral gain at the mechanical oscillator frequency $\omega_D$ while providing a DC signal proportional to the angular rate.

Referring to quantizers 212 in FIG. 9, a dual range conversion approach with high speed over-sampling is employed. A high dynamic range, fourth order $\Delta\Sigma$ modulator converts the analog rate signal to a serial bit stream, each bit representing an angle $\Delta\theta$. These $\Delta\theta$ bits are then summed and sampled by a microprocessor at 5 KHz, which is a factor of 10 higher than the bandwidth, and high speed averaging is performed. Since the signal contains noise this process results in enhanced resolution.

The sensor 20 preferably operates in a closed loop mode, which allows the sensing axes to be tuned to reduce the random walk by orders of magnitude over open-loop devices. The random walk of an open loop tuning-fork gyro, for example, degrades in proportion to its bandwidth, since the pickoff sensitivity continues to decrease as it is tuned further away from the fork's vibration frequency to achieve higher bandwidth.

The oscillating drive motion, or its resulting stress, does not appear at the pickoff. A complete elimination of one of the most damaging error sources is accomplished by having the base of the displacement pickoff move with the sensing element. This feature totally removes the coherent coupling of the imperfections on the oscillating surface of the sensitive elements as they oscillate over the pickoff. Even though the surface finish of the micromachined silicon is on the order of 0.02 microinches it is still many orders of magnitude greater than the amplitude of motion required to be resolved for 0.01 deg/hr performance. This moving pickoff technique also eliminates effects due to any nominal tilt of the sensitive element during micromachining. The signal from such a tilt would couple into the output proportional to the product of the tilt and the angular oscillation amplitude. In many other Coriolis sensing devices the pickoff uses piezoresistive, or piezoelectric stress-sensing transducers for detecting the Coriolis forces. Unfortunately these pickoffs must decouple the full stress of the driven oscillation, which is many billions of times greater than the stress required to resolve 0.01 deg/hr.

The present invention provides inherent common mode rejection of linear vibration. The sensing elements 110 and 112 are inherently balanced such that their centers of gravity are at their centers of suspension. They are not cantilevered as in many other designs. As such, no output is generated for linear vibration inputs. For cantilevered proof masses the signals from two outputs are differenced to reject the sensitivity to vibration. This means that very good gain and phase matching is critical for such cancellation.

For a 5000 Hz resonant frequency and a peak velocity of 0.5 meters/sec, the peak Coriolis acceleration is 0.005 $\mu$G for an input rate of 0.01 /hr. The peak output axis displacement for this acceleration at 5000 Hz is $5.1 \times 10^{-11}$ microns. For a conservative Q value of 500 about the output axis, this motion will amplify to $2.5 \times 10^{-8}$ microns. A pickoff with a nominal gap of 10 microns will generate 1.2 nV for a 5 volt bridge source and an estimated stray and back-plane capacitance of as much as 5 times the gap capacitance. This yields a scale factor of 120 nV per °/hr. With present day instrumentation amplifiers having better than 4 nV/√Hz of noise, the rotation sensor white noise would be better than 0.05 °/hr/√Hz, with allowance for conversion to RMS and full wave demodulation. This noise converts to better than 0.001 °/√hr of random walk. If higher Q's are attained, then this number will decrease proportionally.

In operation of the rotation sensor 20 the Coriolis forces generated when a rate is applied about an axis perpendicular to the axis of oscillation will coerce the sensitive elements to angularly vibrate out-of-plane. Signals from pickoffs mounted on the plates adjacent to the sensing elements measure these motions, are amplified, and then used to generate feedback torques to cancel the effect of the Coriolis forces. The torque required to keep the sensing elements 110 and 112 at null is a measure of the input angular rate.

FIGS. 12–16 illustrate a simplified mechanization embodiment of the invention. The rotation sensor 300 may be visualized as essentially a single axis version of the upper half of the rotation sensor 20 of FIG. 1. The rotation sensor 300 may be operated either open loop or closed loop and may be formed by micromachining or by EDM.

The rotation sensor 300 includes a base 302, a drive element 304 and a sensor member 306. The base 302 has a cylindrical outer wall 308 that encloses a hollow cylindrical region 310. The base 302 has an open upper end and a lower end that comprises a base plate 312. The plate 312 has raised a central hub 314. A set of interconnected drive electrodes 316 are formed on the base plate 312 by a metallization process.

Figure 15:
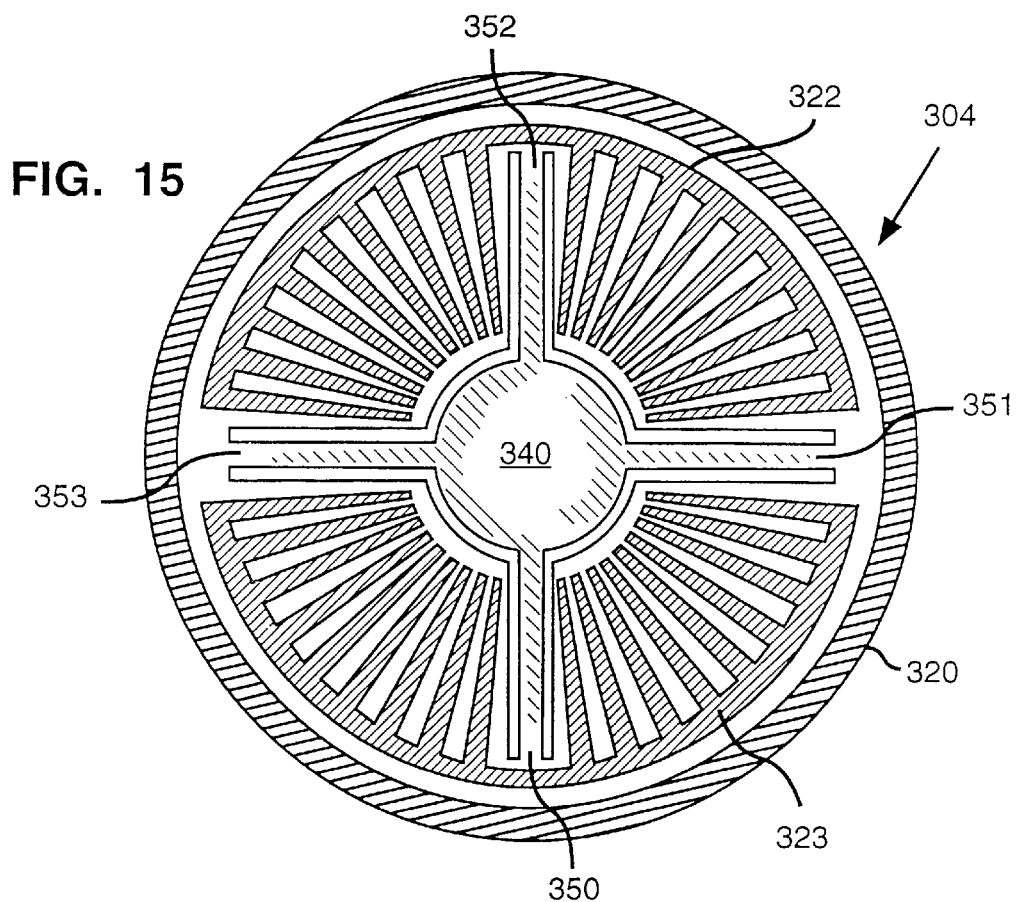
FIG. 15 is a bottom plan view of the driver element of FIG. 14.
Figure 16:
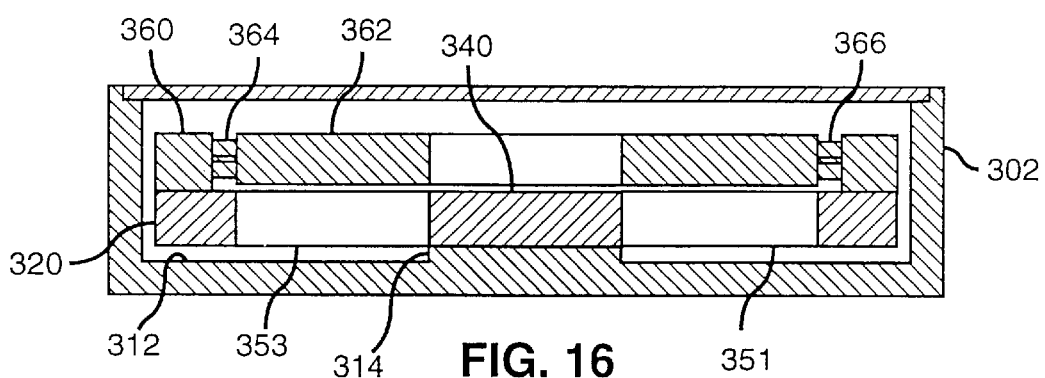
FIG. 16 is a cross sectional view taken along line 16—16 of FIG. 14.

The driving element 304 has an outer torquer/pickoff ring 320 that fits within the cylindrical region 310 of the base 302. FIG. 15 is a bottom plan view of the driving element 304 showing a second set of interconnected drive electrodes 322 formed thereon. The two sets of electrodes 316 and 322 are arranged so that corresponding members of the two sets are angularly offset from one another. Application of alternating electrical signals to the electrodes produces torque between the drive member 304 and the base 302.

Figure 12:
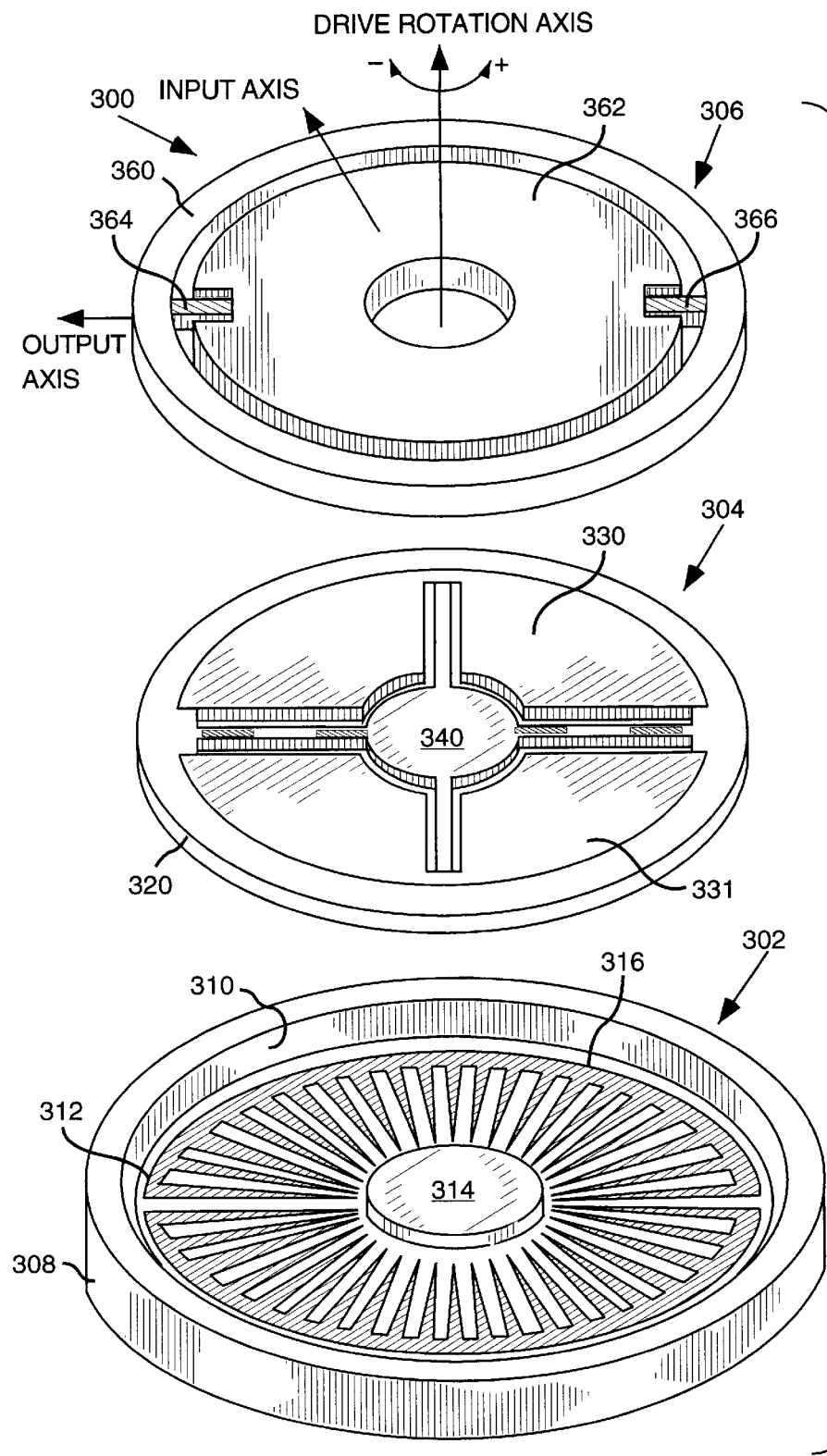
FIG. 12 is an exploded perspective view of a solid state single axis rotation sensor according to the present invention.
Figure 13:
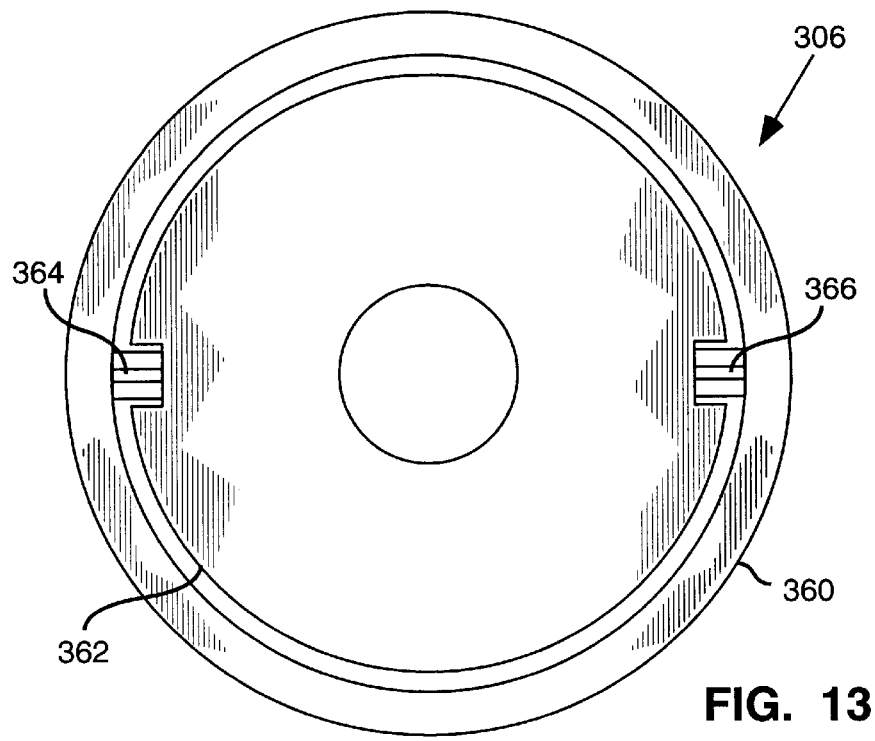
FIG. 13 is a top plan view of a sensor element included in the embodiment of the invention shown in FIG. 12.
Figure 14:
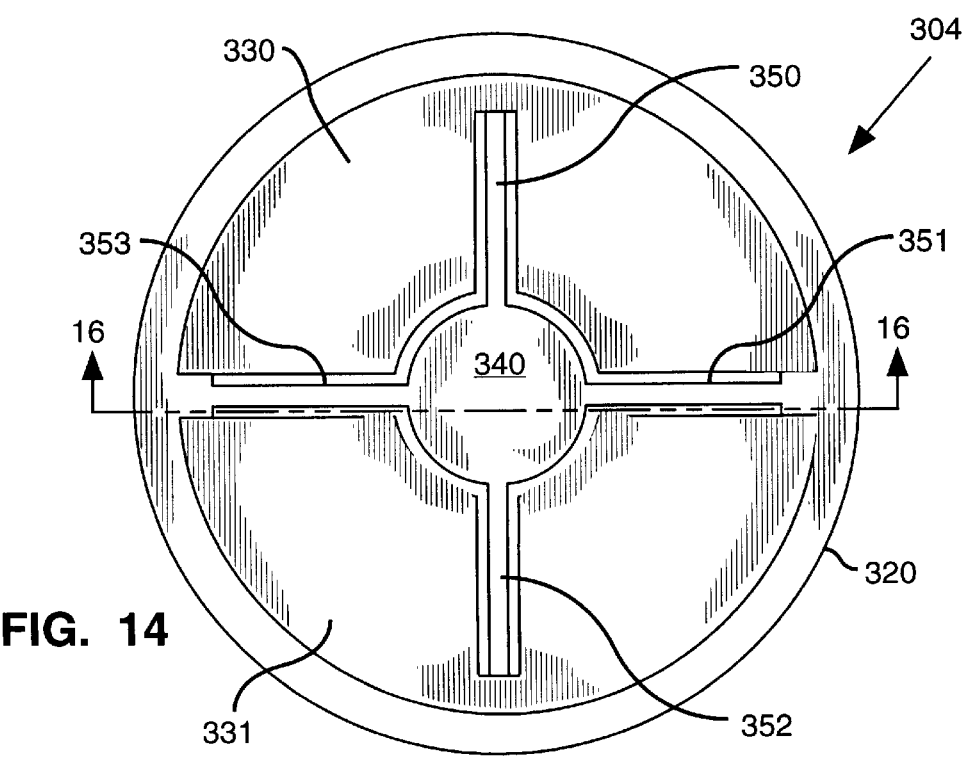
FIG. 14 is a top plan view of a driver element included in the embodiment of the invention shown in FIG. 12.

FIGS. 12 and 14 illustrate the upper surface of the driving element 304. The surface of driving element 304 is divided into two essentially identical metallized electrodes 330 and 331 that may be used for signal pickoff and for applying feedback torque to the sensing member 306.

The driving element 304 includes a central mounting hub 340 that is mounted to the raised central hub 314 of the base 302. The central mounting member 340 is formed by suitable etching or micromachining of the material that forms the driving element 304. The central mounting member 340 may be essentially cylindrical or rectangular and is connected to the outer ring 320 by a plurality of thin beams 350–353 as shown in FIG. 14. The beams 350–353 preferably are angularly spaced apart by 90°.

The driving torque produced by interaction of the two sets of drive electrodes 316 and 322 causes beams 350–353 to flex so that the driving element 304 oscillates in a plane about the drive axis. The sensing member 306 includes an outer support ring 360 and a sensing element sensing element 362. The support ring 360 is mounted to the outer ring 320 of the driving element 304 so that the sensing member 306 also oscillates about the drive axis.

Figure 17:
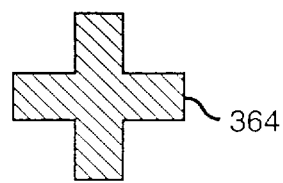
FIGS. 17–19 are cross sectional views of torsion elements that may be included in the sensing element of FIGS. 12 and 13.
Figure 18:
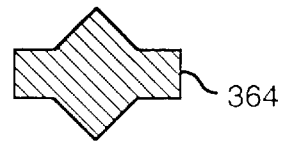
Figure 19:
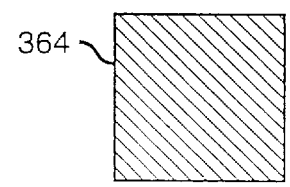

The sensing element 362 is mounted to the support ring 360 by a pair of radially extended torsion bars 364 and 366. FIGS. 17–19 illustrate various cross sections for the torsion bars 364 and 366. A line through the torsion bars 364 and 366 defines the output axis of the rotation sensor 300.

When the rotation sensor 300 oscillates about the drive axis, Coriolis forces cause the sensing element 362 to rotate about its output axis in response to a rotation about the input axis. The capacitance variation between the sensing element 362 and the metallized sections 330 and 331 of the drive element 304 indicates the rotation rate of the rotation sensor 300.

The metallized sections 330 and 331 and the bottom surface of the sensing element 362 may also be used to apply feedback torque to the sensing element 362. In normal operation, sufficient torque is applied to servo the sensing element 362 to its neutral position. The output of the sensor is the electrical signal that must be applied to the torquer electrodes to maintain the sensing element 362 in the neutral position.

If the sensing element 362 is designed to have a natural oscillation frequency that differs from the drive frequency, then the sensor 300 may be operated open loop. In this case the pickoff signal may be amplified and then demodulated with the drive frequency reference signal to produce an angular rate readout.

Figure 20A:
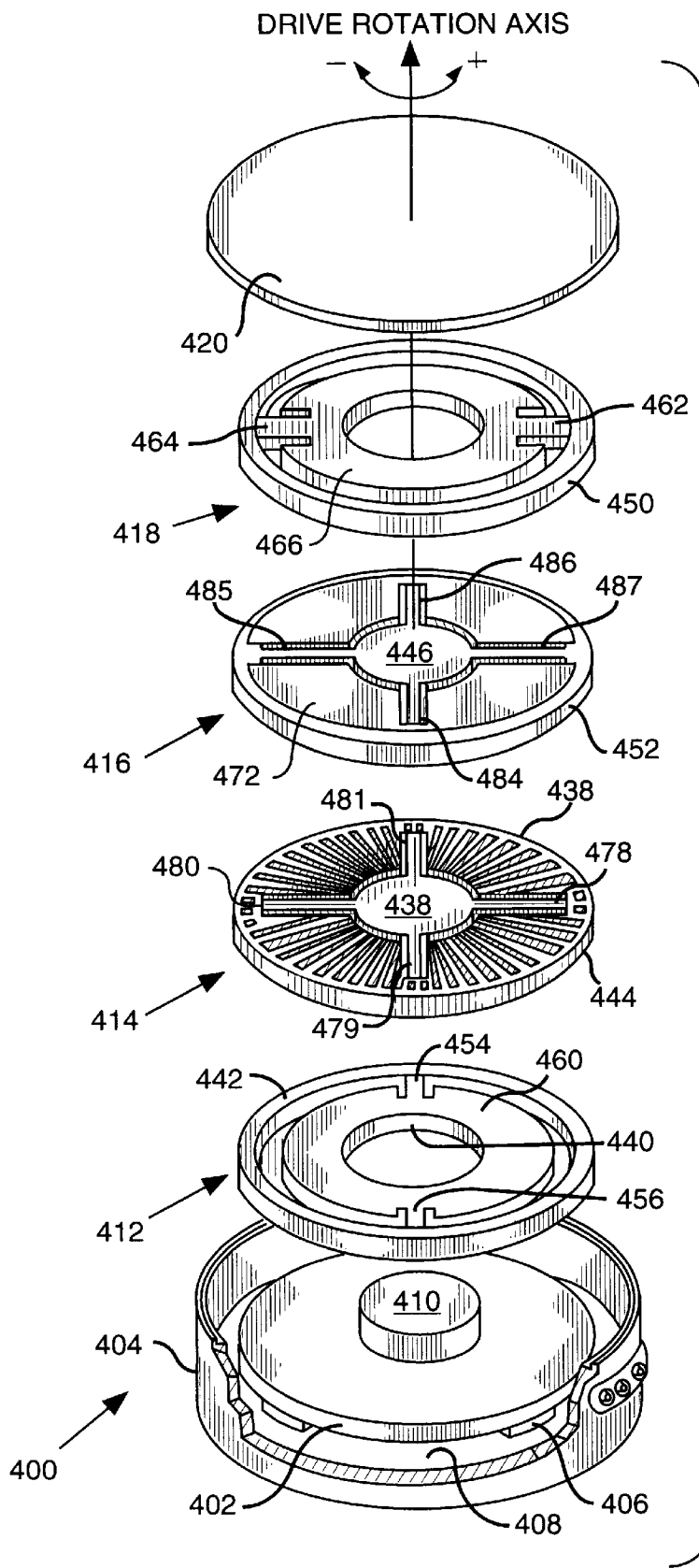
FIG. 20A is an exploded perspective view of a second embodiment of a two axis dual counter-oscillating angular rate sensor according to the present invention.

FIG. 20A illustrates a two axis dual counter-oscillating angular rate sensor 400 according to the present invention. The sensor 400 includes upper and lower driving elements 414 and 416, respectively, that preferably are essentially identical to the driving element 304 described above. The sensor 400 also includes upper and lower sensing members 412 and 418, respectively, that preferably are substantially identical to the sensing member 306, which is also described above.

The sensor 400 includes a mounting plate 402 that is placed within a housing 404. A plurality of compliant, damped pads 406 are placed the between the bottom of the mounting plate 402 and the base plate 408 of the housing 404. The mounting plate 402 includes a raised central hub 410. When the sensor 400 is fully assembled, a cap 420 is secured to an upper rim of the housing 404 to provide isolation from external contaminants and for operating in a vacuum.

The raised central hub 410 of the mounting plate 402 extends through a central passage 440 in the lower sensing member 412. The lower driver element 414 has a central mounting member 438 whose bottom surface is mounted to the upper surface of the raised central hub 410. The lower sensing member 412 has an outer rim 442 that is connected to an outer rim 444 of the lower driver element 414. The upper driver 416 has a central mounting member 446 that is connected to the central mounting member 438 of the lower driver element 414. The upper sensing member 418 has an outer rim 450 that is mounted to an outer rim 452 of the upper driver element 416.

The upper driver element 416 and the upper sensing member 418 are identical to the lower driver element 414 and the lower sensing member 412, respectively. When mounted in the sensor 400, the upper driver element 416 and the upper sensing member 418 are inverted with respect to the lower driver element 414 and the lower sensing member 412, respectively.

The lower sensing member 412 is arranged to have a first torsion axis defined by a pair of radially aligned torsion bars 454 and 456 that support a sensing element 460. The upper sensing member 418 is arranged to have a second torsion axis defined by a pair of radially aligned torsion bars 462 and 464 that support a sensing element 466. For a two-axis rate sensor, the second torsion axis preferably is perpendicular to the first torsion axis.

The driver elements 414 and 416 have driver electrodes 470 and torquer electrodes 472. The driver electrodes of the lower driver element 414 and the upper driver element 416 generally face each with corresponding electrodes of the lower driver element 414 and the upper driver element 416 being angulary displaced from each other as previously described. Therefore, application of a drive voltage to the driver electrodes causes the drivers 414 and 416 to oscillate in-plane about beams 478–481 in the lower driver element 414 and beams 484–487 in the upper driver element 416. Therefore, the assembly of the drivers 414 and 416 and the sensing members 412 and 418 oscillate about the drive axis indicated in FIG. 20A. The oscillations of the upper driver element 416 and the upper sensing member 418 are opposite in direction to the oscillations of the lower driver element 414 and lower sensing member 412. These oscillations are at twice the frequency of the drive signal applied to the drive electrodes 470 so that any coupling of the drive signal to the sensing members 412 and 418 will not be detected as a rate error.

Figure 20B:
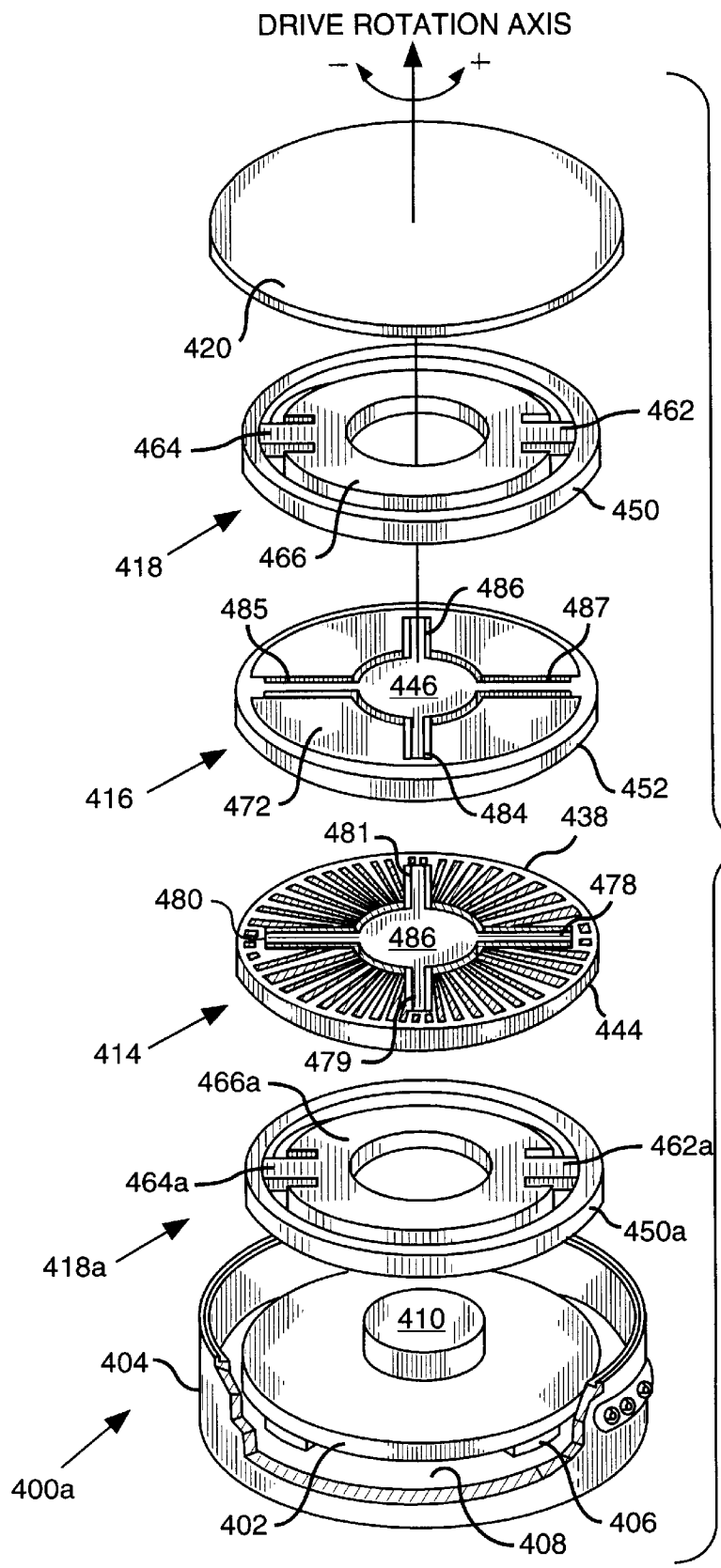
FIG. 20B is an exploded perspective view of a dual sensor, single axis rotation sensor according to the present invention.

FIG. 20B illustrates a single axis rotation rate sensor 400a. The sensor 400a differs from the two axis sensor 400 only in that the lower sensing element 412 of FIG. 20A is replaced by a sensing element 418a, which is essentially identical to the sensing element 418 of FIG. 20A. The components of the sensing element 418a have the same reference characters as the sensing element 418 with the addition of the letter "a".

The sensing element 418a has torsion bars 462a and 464a that are parallel to the torsion bars 462 and 464, respectively. Therefore, the two sensing elements 418 and 418a have parallel sensing axes defined by the torsion axes of the sensing elements 418 and 418a. The rotation rate sensor 400a has the advantage of providing common mode rejection for angular vibration inputs in this single axis sensing device.

Figure 21:
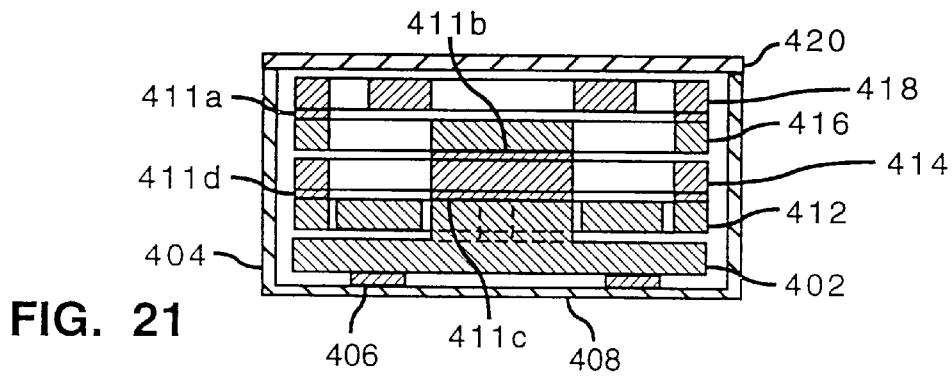
FIG. 21 is a cross sectional view of the apparatus of FIG. 20A.

FIG. 21 is a cross sectional view showing the sensor 400 of FIG. 20A fully assembled by bonding the components together at bonding areas 411a–411d.

Figure 22:
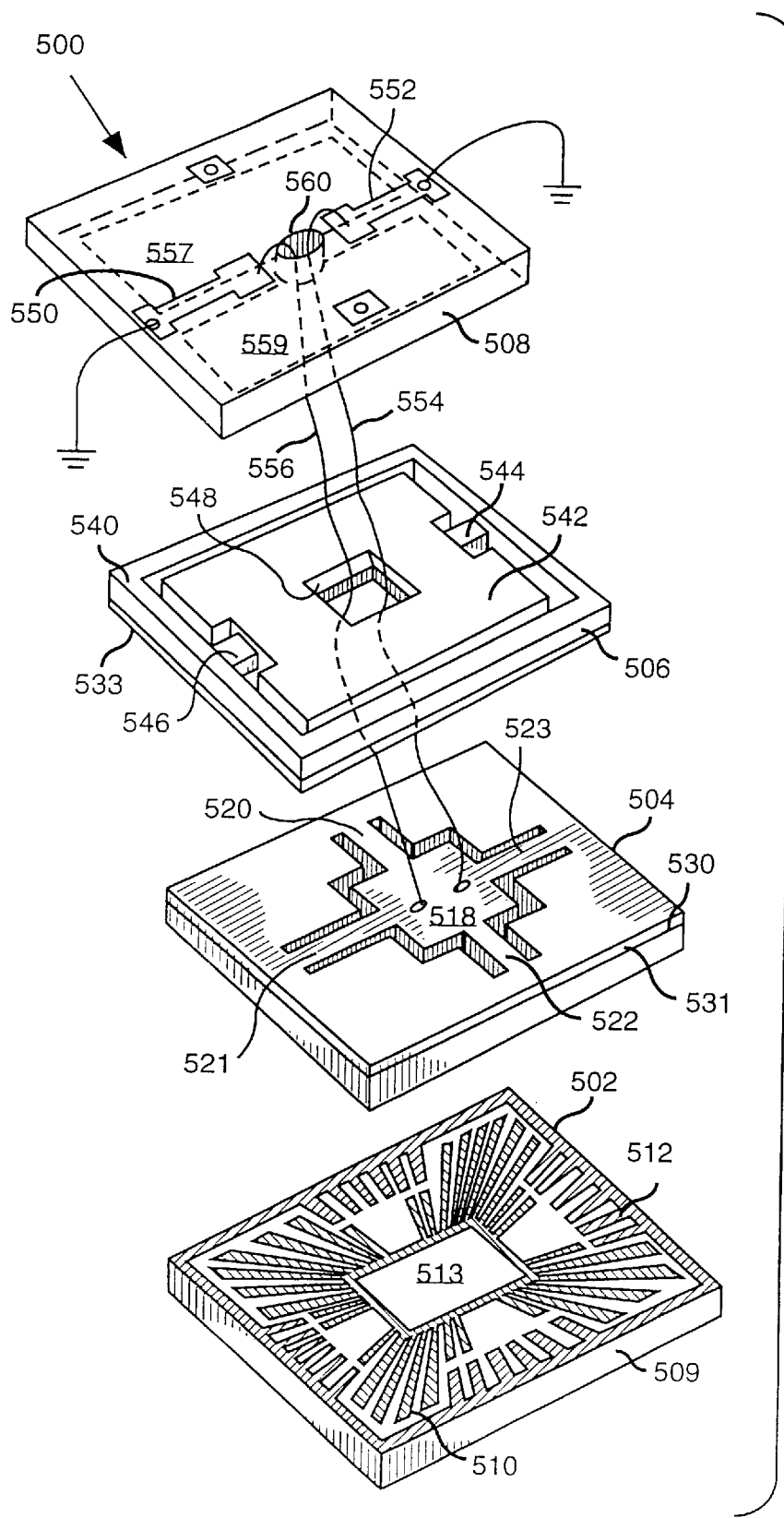
FIG. 22 is an exploded perspective view of a third embodiment of a solid state single axis rotation sensor according to the present invention.

FIG. 22 illustrates another embodiment of the invention. FIG. 22 shows an angular rate sensor 500 having a driving element 502, a driven element 504, a conductive sensing member 506 and a pickoff/torquing element 508.

The driving element 502 preferably includes a substrate 509 formed of Pyrex glass, ceramic or other similar insulating material. The driving element 502 includes a plurality of drive electrodes 510 and a plurality of driver pickoff electrodes 512 metallized on the surface of substrate 509. The driving element 502 preferably includes a central rectangular bonding area 513.

Figure 24:
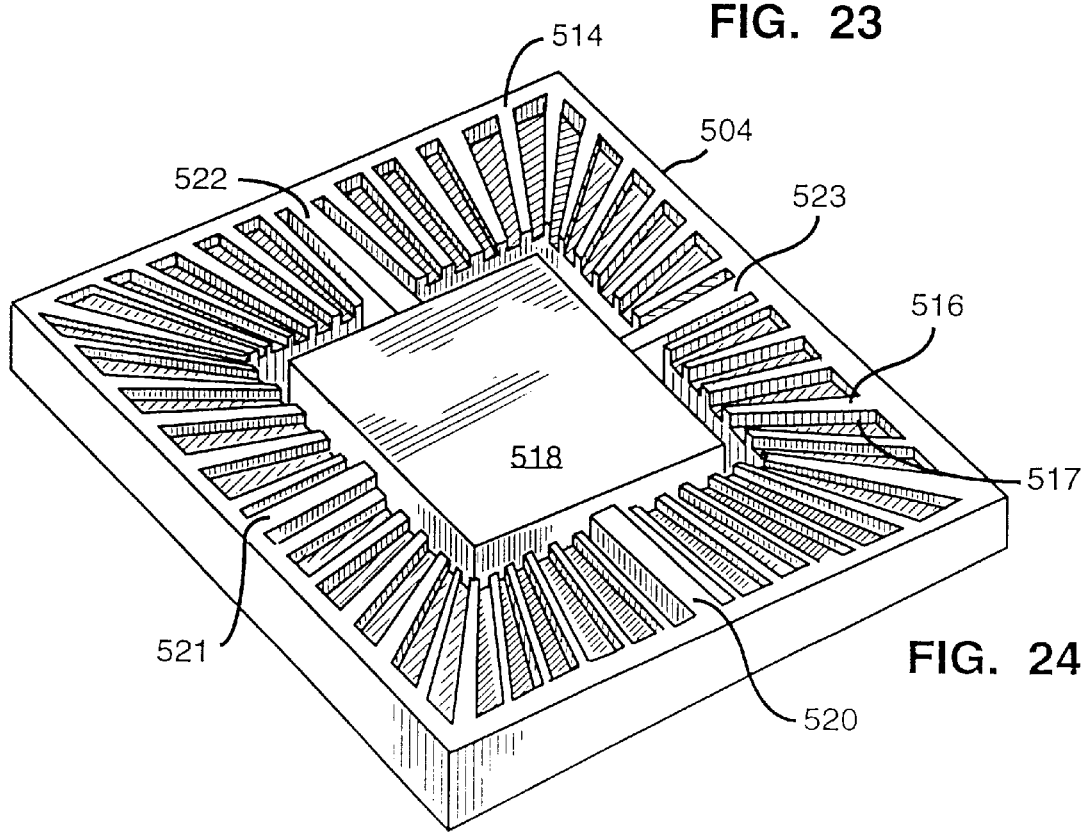
FIG. 24 is a perspective view of a side of the driven element of FIG. 22 showing an anodic bonding area and a plurality of drive electrodes.

FIG. 24 illustrates the surface 514 of the driven element 504 that faces the driving element 502. The driven element 504 preferably is formed as a silicon wafer. A plurality of electrodes 516 are formed on the surface 514 of the driven element. The electrodes 516 remain after grooves 517 are etched into the surface 514. The grooves preferably are etched to a depth of about 0.003 ". The bottom surfaces of the grooves are then metallized to form the electrodes 516. The electrodes 516 are angularly displaced from the drive electrodes 510 so that application of an electrical signal produces a torque on the driven element 504 in the manner described above for other embodiments of the invention.

The central portion of the driven element is an anodic bonding area 518 that is supported on two pairs of radially extending beams 520–523. The anodic bonding area 518 is generally rectangular in shape. The beams 520–523 extend perpendicularly outward from the sides of the anodic bonding area 518. The surface 514 of the driven element preferably is etched down from the anodic bonding area by a distance of about 5 μm. The anodic bonding area 518 and the beams 520–523 preferably are formed by a reactive ion etching (RIE) process.

Referring again to FIG. 22, the upper surface 530 of the driven element 504 preferably is coated with an oxide layer 531 to provide electrical insulation. The lower surface of the sensing member 506 also preferably is coated with an oxide layer 533.

The sensing member 506 has a generally rectangular outer frame 540. A sensing element 542 is formed inside the frame 540 by etching just inside the outer edges of the frame 540. The etching process leaves the generally rectangular sensing element 542 being supported by two radially aligned torsion bars 544 and 546 that extend between two opposite ends of the sensing element and the frame 540. The frame 540 is secured to the upper surface 530 of the driven element 504 so that oscillations of the driven element 504 are transmitted to the sensing member 506.

The pickoff/torquing element 508 preferably is formed of Pyrex glass, ceramic or other similar insulating material. The pickoff/torquing element 508 is bonded to the frame 540 of the sensing member 506. The pickoff/torquing element 508 includes a pair of metallized portions 550 and 552 that serve as electrodes to provide a ground as shown or a bias voltage to the driven element 504. Wires 554 and 556 from the electrodes 550 and 552 pass through a central passage 560 in the pickoff/torquing element 508 and through an opening 548 in the sensing element 542.

Pickoff motion detection and torquing of the sensing element 542 are provided by electrodes 557 and 559, which are metallized to the bottom of the pickoff/torquing element 508.

Figure 23:
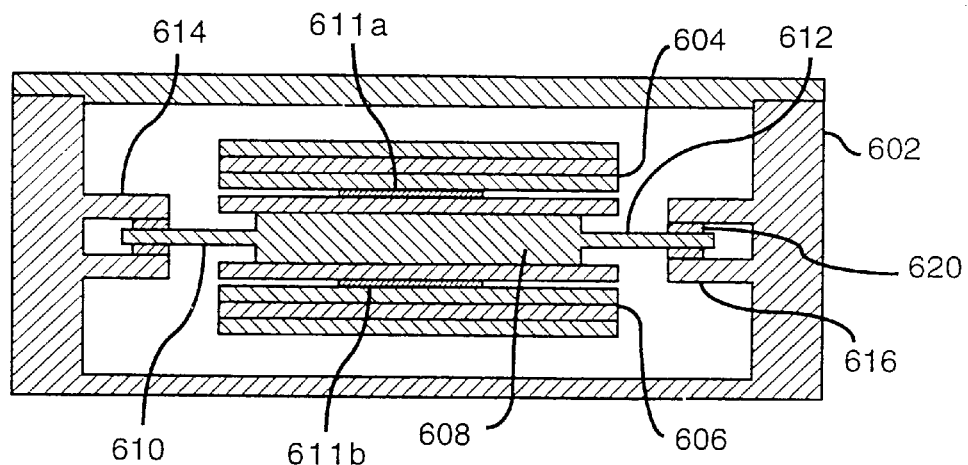
FIG. 23 is a cross sectional view of an apparatus which combines two of the devices of FIG. 22 to produce a two-axis dual counter-oscillating angular rate sensor according to the present invention.

FIG. 23 is a cross sectional view illustrating how two sensors like the sensor 500 may be mounted back-to-back to provide a sensor system 600 that has no reaction force on its case 602. An upper sensing unit 604 and a lower sensing unit 606 are mounted on opposite sides of a coupling element 608. The sensing axes of the upper sensing unit 604 and the lower sensing unit 606 are at 90° to each other to provide a two-axis sensor. As an alternative, the sensing axes may be aligned in parallel to provide dual precision single axis sensing with angular vibration rejection for frequencies near the driven frequency.

The coupling element 608 has a pair of flanges 610 and 612 that extend toward the case 602. A pair of brackets 614 and 616 are mounted inside the case 602 to receive the flanges 610 and 612, respectively. Torsionally compliant mounts 620, which are compliant in shear about the driven axes preferably are placed between the flanges 610 and 612 and their corresponding brackets to enable the sensor system 600 to be driven with a single frequency counter-oscillating drive.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and range of equivalence of the claims are embraced within the scope of the invention.

What is claimed is:

1. A rotation sensor, comprising:

a frame:

a drive member connected to the frame through a rotationally compliant mounting device:

a driving mechanism connected to the drive member to produce rotational oscillations of the drive member about a drive axis; and a sensing apparatus having a support element connected to the drive member such that rotational oscillations of the drive member about the drive axis are transmitted to the support element, the sensing apparatus further including;

a sensing element connected to the support element and arranged to oscillate with the support element about the drive axis, the sensing element being arranged to oscillate rotationally relative to the support element about a sensing axis perpendicular to the drive axis for input rotation rates of the frame about an input axis which is perpendicular to both the sensing axis and the drive axis, the sensing element being formed such that its moment of inertia about the drive axis is substantially equal to the sum of the moments of inertia about its two principal axes perpendicular to the drive axis; and apparatus for generating a signal indicative of the input rotation rate as a function of the amplitude of the oscillations of the sensing element.

2. The rotation sensor of claim 1 wherein the sensing element is arranged to oscillate rotationally relative to the support element about a pair of sensing axes that are mutually perpendicular and perpendicular to the drive axis.

3. The rotation sensor of claim 1 wherein the driving mechanism comprises:

a driving element that includes:
a substrate;
a first set of drive electrodes formed on a surface of the substrate; and a driven element that includes:
a wafer; and
a second set of drive electrodes formed on a surface of the wafer corresponding to the first set of drive electrodes, the wafer and substrate being arranged in facing relationship such that corresponding members of the first and second sets of electrodes are angularly displaced from one another so that application of an electrical signal to the first and second sets of electrodes produces a torque on the driven element.

4. The rotation sensor of claim 1 wherein a pair of torsion bars extend between the support element and the sensing element in alignment with the sensing axis.

5. The rotation sensor of claim 1 wherein the sensing element is arranged to oscillate rotationally relative to the support element about a pair of sensing axes that are mutually perpendicular and perpendicular to the drive axis, the sensing apparatus further including a first pair of leaf springs extending between the support element and the sensing element in alignment with a first one of the sensing axes and a second pair of leaf springs extending between the support element and the sensing element in alignment with the other sensing axis.

6. The rotation sensor of claim 3 wherein the driving mechanism includes a plurality of flexure beams extending from a central portion of the driven element perpendicular to the drive axis and formed to allow the driven element to oscillate angularly about the drive axis.

7. A rotation sensor, comprising:

a housing;

a mounting plate placed in the housing with a plurality of compliant, damped pads arranged between the housing and the mounting plate;

a hub extending from the mounting plate;

a first drive member connected to the hub, the first drive member being arranged to produce rotational oscillations about a drive axis;

a first sensing apparatus having a support element connected to the drive member such that rotational oscillations of the drive member about the drive axis are transmitted to the support element, the first sensing apparatus further including:

a sensing element connected to the support element and arranged to oscillate with the support element about the drive axis, the sensing element being arranged to oscillate rotationally relative to the support element about a sensing axis perpendicular to the drive axis for input rotation rates of the frame about an input axis which is perpendicular to both the sensing axis and the drive axis, the sensing element being formed such that its moment of inertia about the drive axis is substantially equal to the sum of the moments of inertia about its two principal axes perpendicular to the drive axis; and apparatus for generating a signal indicative of the input rotation rate as a function of the amplitude of the oscillations of the sensing element about the first sensing axis;

a second drive member connected to the first drive member, the second drive member being arranged to produce rotational oscillations about the drive axis that are opposite in direction to the rotational oscillations produced by the first drive member;

a second sensing apparatus connected to the drive member, the second sensing apparatus being substantially identical to the first sensing apparatus and having a second sensing element arranged to oscillate rotationally relative to the support element about second sensing axis that is parallel to the first sensing axis and including apparatus for generating a signal indicative of the input rotation rate as a function of the amplitude of the oscillations of the second sensing element about the second sensing axis.

8. The rotation sensor of claim 7 wherein the second sensing axis is perpendicular to the first sensing axis.

9. A rotation sensor, comprising:

a base;

a hub extending from the base;

a first set of drive electrodes formed on the base;

a drive element mounted to the hub and including a second set of drive electrodes formed thereon corresponding to the first set of drive electrodes, the base and drive element being arranged in facing relationship such that corresponding members of the first and second sets of electrodes are angularly displaced from one another so that application of an electrical signal to the first and second sets of electrodes produces a torque on the drive element that produces rotational oscillations of the drive element in a plane about a drive axis;

a sensor member that includes:

an outer support ring mounted to the drive element so that rotational oscillations of the drive element are transmitted to the sensor member, the sensor member further including a sensing element inside the support ring and a pair of torsion bars connected between the outer support ring and the sensing element, the pair of torsion bars being aligned to define an output sensing axis; and apparatus for generating a signal indicative of an input rotation rate about an axis perpendicular to the drive axis and the sensing axis as a function of the amplitude of the oscillations of the sensing element about the output sensing axis.

10. The rotation sensor of claim 9, further comprising:

a first metallized section formed on the drive element; and a second metallized section formed on the sensing element, the first and second metallized sections forming a capacitor having a capacitance that depends upon the rotation rate of the sensing element about an axis perpendicular to the drive axis and the sensing axis.

11. The rotation sensor of claim 10, further including apparatus connected to the first and second metallized sections for applying feedback torque to the sensing element to null the output angular oscillations and maintain the sensing element in a null position.

12. The rotation sensor of claim 10, further comprising:

apparatus for applying an oscillatory electrical signal having a frequency $\omega_D/2$ to the first and second sets of drive electrodes such that the drive element mechanically oscillates at the drive frequency $\omega_D$, wherein the sensing element is formed to have a natural frequency of oscillation about the torsion bars that differs from drive frequency $\omega_D$ so that the sensor operates open loop; and apparatus for demodulating signals at the drive frequency $\omega_D$ indicative of the capacitance between the metallized sections.

13. A rotation sensor, comprising:

a base;

drive apparatus comprising:

a first drive member having a first frame mounted to the base, the first drive member being formed of a silicon wafer having a first pair of oppositely-facing planar surfaces, the first drive member further including a first drive member central portion connected to the frame such that there is rotational compliance between the frame and the central portion about an axis perpendicular to the planar surfaces of the silicon wafer, and a first plurality of drive electrodes formed on the first drive member central portion;

a second drive member having a second frame mounted to the first frame, the second drive member being formed of a silicon wafer having a second pair of oppositely-facing planar surfaces, the second drive member further including a second drive member central portion connected to the second frame such that there is rotational compliance between the second frame and its central portion about an axis perpendicular to the planar surfaces of the silicon wafer, and a second plurality of drive electrodes formed on the second drive member central portion;

drive signal apparatus for applying a drive signal having a drive signal frequency $\omega_D$ to the plurality of drive electrodes, the plurality of drive electrodes being arranged such that the drive signal causes counter rotational oscillations of the two drive member central portions at the frequency $\omega_D$ about a drive axis perpendicular to the planar surfaces of the wafer;

first and second sensing members mounted to the first and second drive members, respectively, each of the first and second sensing members including:
- a sensing member central support member connected to the corresponding drive member central portion such that rotational oscillations of the drive member central portion are transmitted to the sensing member central portion; and
- a sensing element connected to the sensing member central support member to allow the sensing element to oscillate about the drive axis and to allow an input rotation rate about an input axis perpendicular to the drive axis to produce out-of-plane oscillations of the sensing element about a sensing axis perpendicular to the input axis and the drive axis at an oscillation amplitude that is a function of the input rotation rate; and signal processing apparatus connected to the sensing elements for producing a sensor output signal indicative of the input rotational rates as a function of the amplitude of the out-of-plane oscillations of the sensing element.

14. The rotation sensor of claim 13 wherein each of the first and second drive members includes a plurality of flexure beams extending between its frame and the corresponding drive member central portion to provide the rotational compliance.

15. The rotation sensor of claim 13, wherein each of the sensing members comprises a plurality of generally planar leaf spring members connected between the sensing member central support member and the sensing element such that the out-of-plane oscillations in the sensing element are perpendicular to the planes of the leaf spring members.

16. The rotation sensor of claim 15, further comprising a capacitive pickoff formed between one of the sensing elements and the drive apparatus to provide the sensor output signal.

17. The rotation sensor of claim 13, further comprising a plurality of base mounts connected between the base and the drive member, each base mount being formed to comprise a damped compliant element for providing a single mechanical resonant frequency in the rotation sensor and for attenuating external vibration inputs.

18. The rotation sensor of claim 13 wherein the first and second sensing members include first and second elements, respectively, which are arranged to oscillate in opposite directions in response to an input rotation rate.

19. The rotation sensor of claim 13, further comprising:
- a first capacitive pickoff arranged to provide a first electrical pickoff signal indicative of the amplitude of out-of-plane oscillations of the first sensing element; and
- a second capacitive pickoff arranged to provide a second electrical pickoff signal indicative of the amplitude of out-of-plane oscillations of the second sensing element.

* * * * *